UNITED STATES PATENT OFFICE.

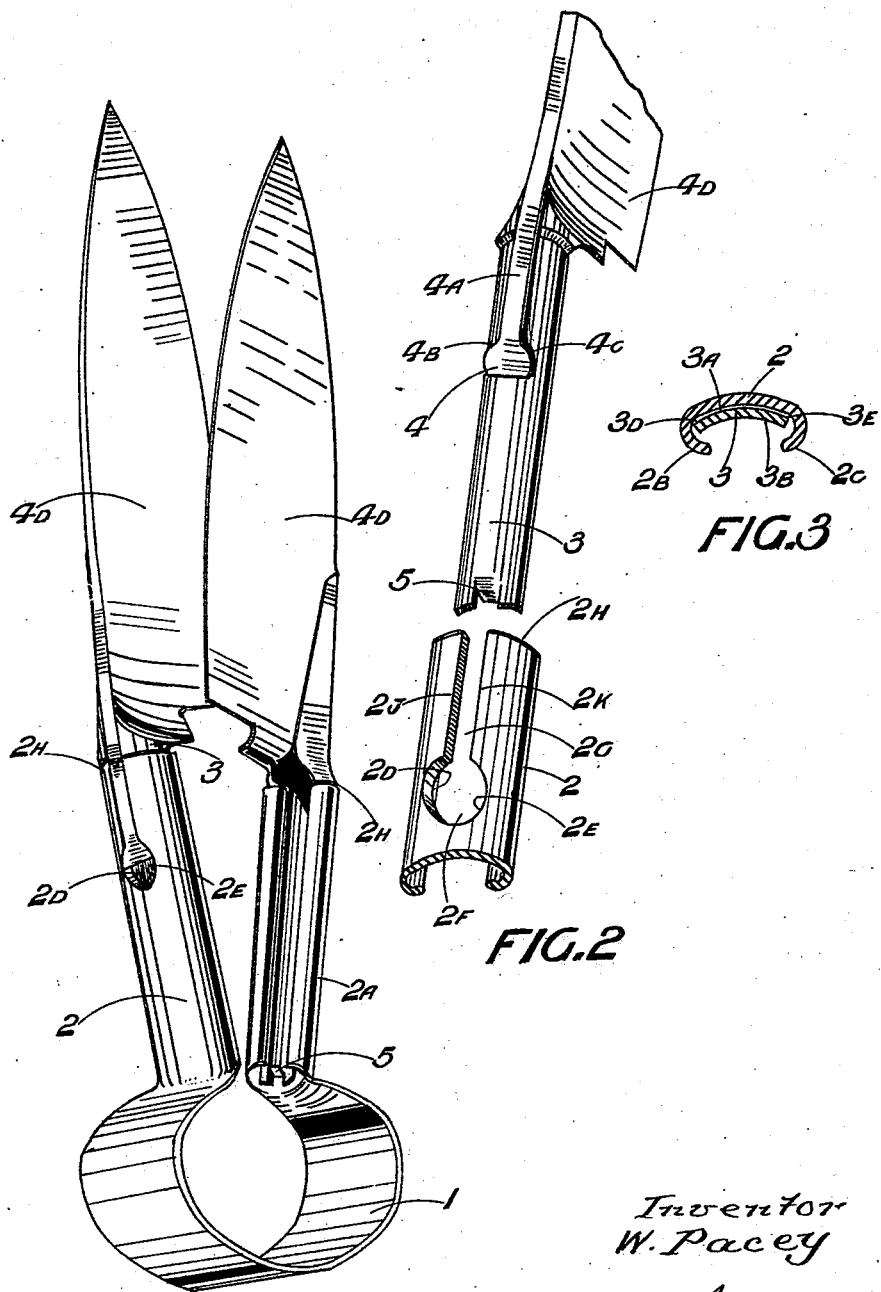

WILLIAM PACEY, OF DUNEDIN, NEW ZEALAND.

HAND SHEARS.

1,415,609. Specification of Letters Patent. Patented May 9, 1922.

Application filed November 19, 1919, Serial No. 339,059. Renewed April 1, 1922. Serial No. 548,795.

*To all whom it may concern:*

Be it known that I, WILLIAM PACEY, a subject of King George V of Great Britain, residing at 40 Dowling Street, Dunedin, New Zealand, have invented certain new and useful Improvements in or Relating to Hand Shears, of which the following is a specification.

This invention relates to shears, a tool used for hand shearing sheep, and on occasions by gardeners for trimming the edges of grass lawns and the like places.

The object of my invention is to provide means whereby the blades of shears may be easily and quickly detached from the handle for sharpening purposes, or a new blade or blades easily and expeditiously fitted in position on the handle, whereby the blades may be interchangeable.

The invention will be clearly understood from the following detailed description and the illustration accompanying the specification in which:

Figure 1 is a perspective view of the invention, all the parts being assembled.

Figure 2 is a part perspective view enlarged to more clearly illustrate the method of attaching the blade to the handle.

Figure 3 is a view showing the cross sectional contour of the handle and the blade shank.

According to this invention, the usual spring 1 forming the bow or butt of the handle may be used to hold the blades normally open, instead of the handle portion 2 and $2^A$ having the usual cross sectional form, the edges $2^B$ and $2^C$ are curled inwards to form a bead, forming together a socket, wherein the shank 3 of the blade $4^D$ is housed, the said shank 3 is convex on its outer surface $3^A$ and concave on its inner surface $3^B$, the convexity of its outer surface conforming with the concave form of the inner surface of the handle part 2 and $2^A$ and the edges $3^D$ and $3^E$ of the said shank 3 are formed in a manner to engage the inner surface of the beads $2^B$ and $2^C$ and the handle parts 2 and $2^A$, so that when all parts are assembled the blade will be rigidly retained.

There is a catch 4 provided, preferably forming part of the blade $4^D$, the said catch has a resilient member $4^A$ under the influence of which the said catch 4 is held normally inclined towards the shank 3 of the blade and the shoulders $4^B$ and $4^C$ of the shank 3, and is adapted to engage with shoulders $2^D$ and $2^E$ formed by boring a hole $2^F$ in the said handle parts 2 and $2^A$.

There is a slot $2^G$ cut in the handle parts from the ends $2^H$ thereof to the hole $2^F$ joining with the said hole approximately at the shoulders $2^D$ and $2^E$, the said slots are provided for the purpose of permitting the catch 4 and its resilient member $4^A$ to lie flush with the outside surface of the handle parts 2 and $2^A$ so as not to chafe the hands of the user, and to prevent lateral movement of the blade.

There is a lug member 5 formed in the ends of the blade shank member 3 for the purpose of forming a head, which in the event of the blade shank catching or becoming too firm in the socket, it may be tapped lightly with anything convenient to assist entry and withdrawal of the blade.

The method of detaching and attaching is obvious from the drawing, and while Figure 1 shows the two blades assembled with the shanks 3 firmly home in their sockets formed in the handle parts 2 and $2^A$, and indicating the said blades retained in their sockets by the catch 4 and its resilient stem $4^A$, Figure 2 indicates the method of entering the shank 3 to the socket of the handle part 2. On pushing the blade home in its socket the catch 4 rides over the surface $2^J$ and $2^K$ until it is released over the hole $2^F$ and under the influence of the resilient member $4^A$, the catch drops into the said hole $2^F$ and the shoulders $4^B$ and $4^C$ engage with the shoulders $2^D$ and $2^E$ thus securing the blade in position. To remove the blade the catch 4 is raised until the shoulders become disengaged, then applying a steady pull, the blade separates from the handle.

Having described my invention, what I claim as new and desire to secure by Letters Patent is:—

Hand shears having the shank portions formed concavo-convex with the edges bent to present lips, and blades having extensions to fit the inner surfaces of such shanks and be retained by the lips, said blade extensions having spring catches to ride over the surface of the shanks opposite that engaged by such extensions and cooperate with openings formed in said extensions.

In testimony whereof I affix my signature.

WILLIAM PACEY.

Witnesses:
 ROBERT PARK, Jr.,
 JOHN C. COLLINS.